US012041133B1

(12) United States Patent
Gafa et al.

(10) Patent No.: US 12,041,133 B1
(45) Date of Patent: *Jul. 16, 2024

(54) SYSTEM AND METHOD FOR CONTROLLING REMOTE SESSIONS EXECUTING ON OTHER DEVICES

(71) Applicant: PARALLELS INTERNATIONAL GMBH, Schaffhausen (CH)

(72) Inventors: Paul Gafa, Sliema (MT); Nikolay Dobrovolskiy, Moscow (RU); Serguei M Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,788

(22) Filed: Apr. 24, 2023

Related U.S. Application Data

(63) Continuation of application No. 17/570,864, filed on Jan. 7, 2022, now Pat. No. 11,659,042, which is a continuation of application No. 15/992,436, filed on May 30, 2018, now Pat. No. 11,233,853.

(51) Int. Cl.
| | | |
|---|---|---|
| G06F 15/16 | (2006.01) | |
| H04L 67/125 | (2022.01) | |
| H04L 67/141 | (2022.01) | |
| H04L 67/01 | (2022.01) | |

(52) U.S. Cl.
CPC .......... *H04L 67/125* (2013.01); *H04L 67/141* (2013.01); *H04L 67/01* (2022.05)

(58) Field of Classification Search
CPC ...... H04L 67/125; H04L 67/141; H04L 67/01
USPC .......................................................... 709/227
See application file for complete search history.

(56) References Cited

U.S. PATENT DOCUMENTS

| | | | |
|---|---|---|---|
| 2011/0307865 A1 | 12/2011 | Grieves et al. | |
| 2012/0317237 A1* | 12/2012 | Kazan | G06F 9/54 |
| | | | 709/219 |
| 2013/0073508 A1 | 3/2013 | Zhou et al. | |
| 2013/0290856 A1* | 10/2013 | Beveridge | G06F 3/1454 |
| | | | 715/740 |
| 2017/0277498 A1 | 9/2017 | Wood et al. | |
| 2019/0158569 A1 | 5/2019 | Singleton et al. | |
| 2020/0045097 A1 | 2/2020 | Abiezzi et al. | |
| 2021/0109836 A1* | 4/2021 | Cranfill | G06F 3/048 |

* cited by examiner

*Primary Examiner* — Nicholas P Celani
*Assistant Examiner* — Karina J Garcia-Ching
(74) *Attorney, Agent, or Firm* — Rosenberg, Klein & Lee

(57) ABSTRACT

Disclosed are systems and methods for managing an application executing in a remote session. A user device (e.g., mobile device) creates a control communication session for an application executing within a remote session established between a remote application server and a client device. This application is being displayed by the client device. The user device receives metadata indicating a subset of user actions available from the application, and uses it to generate, for display on the user device, a graphical user interface. The graphical user interface is configured to, when activated by user input, inject input commands into the remote session for the application.

3 Claims, 5 Drawing Sheets

SYSTEM AND METHOD FOR CONTROLLING REMOTE SESSIONS EXECUTING ON OTHER DEVICES

CROSS-REFERENCE TO RELATED APPLICATIONS

This application claims the benefit of priority as a continuation of U.S. patent application Ser. No. 17/570,864 filed Jan. 7, 2022; which itself claims the benefit of priority from U.S. patent application Ser. No. 15/992,436 filed May 30, 2018, which has issued as U.S. Pat. No. 11,233,853; the entire contents of each being incorporated herein by reference.

FIELD OF TECHNOLOGY

The present disclosure relates generally to the field of remotely controlling applications, more specifically, to a system and methods of remotely controlling applications executing in a remote session established between other devices.

BACKGROUND

In the past decade, capabilities of computer systems have increased significantly. Computer systems process large volumes of data, which is changed or updated constantly. Even well-known and widely distributed applications are upgraded very often, so consumers have to download new software remotely. One conventional approach that allows users to have access to files and applications residing on a remote system is so-called "dumb terminal" or "thin client" that is connected to a large central computer or a computer cluster. The applications are only installed on the central computer, and users run the applications remotely. The user can control the application through a GUI of the local display, while no application executable code is loaded onto the user's computer.

The industry trend of using mobile devices and various tablets presents some challenges with regard to remote access to desktop/laptop computers. For example, a user wants to open an application on a remote desktop of a computer from his mobile device. However, the application window, or some representation of its contents, has to be delivered to the mobile device in real time. This presents a problem in the existing systems, where the client receives a message about a new contents of the application window, but only can see old images that do not correspond to the current contents of the remote application windows. In other words, the remote desktop contents are not synchronized with what is shown on a mobile device, which cause delays in rendering images (applications windows) on the mobile device.

SUMMARY

Thus, a system and method is disclosed herein for managing remote sessions, and, more particularly, for providing a control-board-style graphical user interface that can remotely control applications running in a remote session.

According to an aspect, the described system enables users to control published applications that are shown on "remote application" client devices from other devices (e.g., a mobile device). For example, there may be situations in which the published application(s) being shown on a monitor or projector (e.g., running presentations or promotional information) of a client device needs to be changed or modified, but the input devices of the client device are inaccessible to the user. The described system enables the user to make changes, provide commands to, and/or interact with the published application with the help of another device ("user device") that provides a control board graphical user interface for interacting with the published application.

According to one aspect of the present disclosure, a computer-implemented method is provided for managing an application executing in a remote session. The method includes creating, by a user device, a control communication session for an application executing within a remote session established between a remote application server and a client device, wherein the application is displayed by the client device. The method further includes receiving metadata associated with an application executing in the remote session, wherein the metadata indicates a subset of user actions available from the application. The method includes generating, for display on the user device, a control board graphical user interface (GUI) based on the received metadata, wherein the control board GUI is configured to, when activated by user input, inject input commands into the remote session for the application.

In another aspect, the control communication session is established between the user device and the client device executing a thin client application, wherein the injected input commands are relayed by the client device to the remote application server.

In another aspect, the control communication session is established between the user device and the remote application server, wherein the injected input commands are transmitted directly to the remote application server.

In another aspect, the input commands are configured to cause a display update of the application at the client device and not on the user device.

In another aspect, the method further includes receiving a list of available applications in the remote session if there is no currently running application in the remote session, and prior to creating the control communication session, causing the remote application server to launch a selected application within the remote session.

In another aspect, the control board GUI is displayed on the user device and not on the client device.

According to another aspect of the present disclosure, a user device is provided for managing an application executing in a remote session. The user device includes a display device configured to receive user input, and a hardware processor. The hardware processor is configured to create a control communication session for an application executing within a remote session established between a remote application server and a client device, wherein the application is displayed by the client device. The hardware processor is further configured to receive metadata associated with an application executing in the remote session, wherein the metadata indicates a subset of user actions available from the application. The hardware processor is configured to generate, for display on the display device, a control board graphical user interface (GUI) based on the received metadata, wherein the control board GUI is configured to, when activated by user input, inject input commands into the remote session for the application.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing a remote session. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
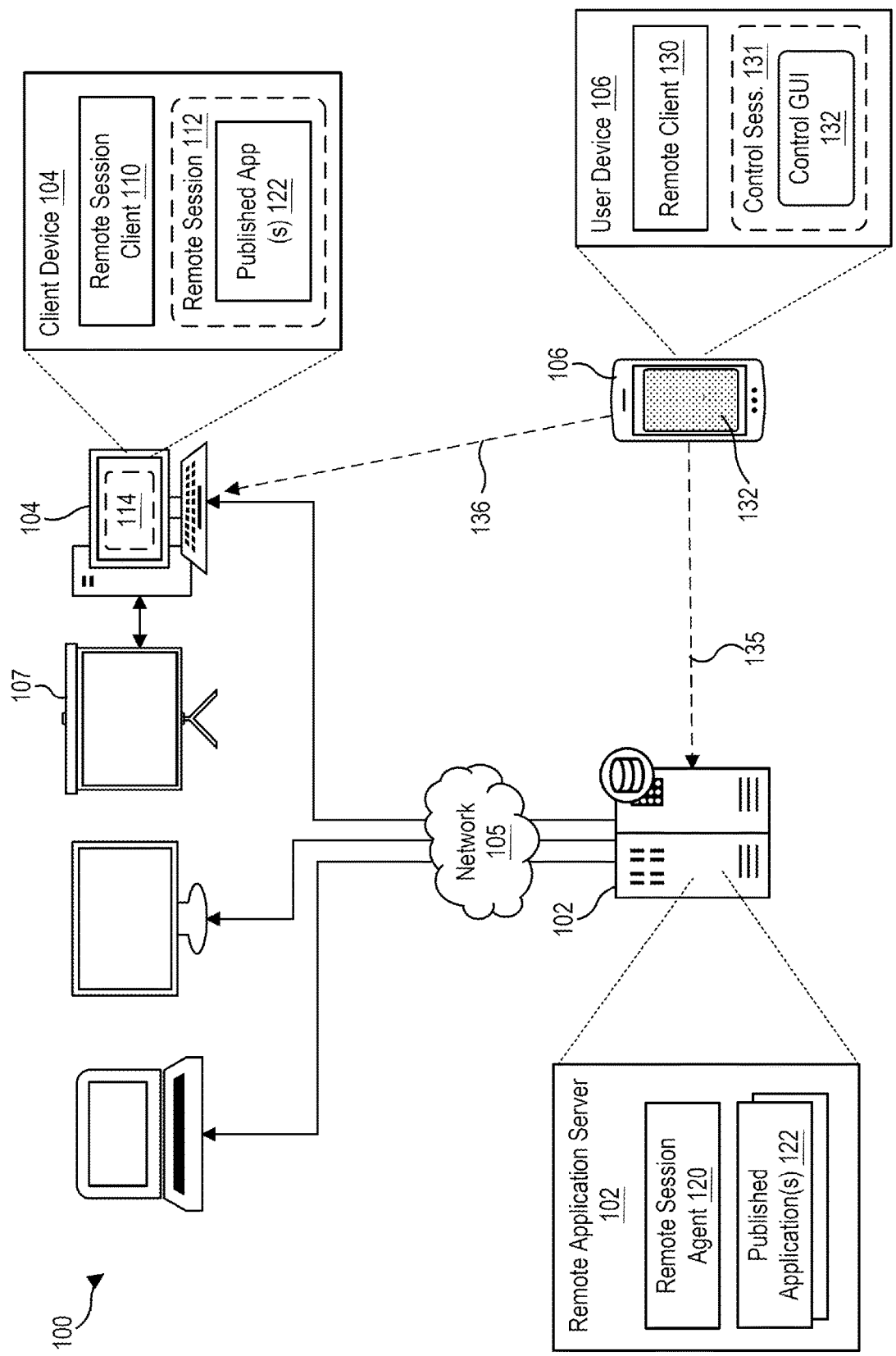
FIG. 1 is a block diagram of a system for remotely controlling an application executing in a remote session according to an exemplary aspect.

FIG. 1 is a block diagram of a system 100 for remotely controlling an application executing in a remote session according to an exemplary aspect. The system 100 may be a distributed system that includes one or more client devices 104 communicatively connected to a remote application server 102 via a network 105.

The client devices 104 and/or the remote application server 102 may be any computing device, physical server, computer server, desktop, laptop, handheld device, tablet device, smartphone, or any other electronic device as described herein. The network connection between the client device(s) 104 and the remote application server 102 may be a network socket, or other more complex communication channel. In some aspects, the network 105 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In one aspect, the client device 104 includes a remote session client 110 configured to establish a remote session 112 with a remote session agent 120 executing on the remote application server 102. The remote session 112 established between the remote session client 110 and the remote application server 102 may be configured to provide access at the client device 104 to one or more applications that might not be otherwise available or installed locally on the client device 104. In one aspect, the remote session agent 120 may be a remote application server (RAS) agent configured to remotely provide instances of software applications to the client device 104. In other words, the remote session agent 120 is said to "publish" resources, which can include one or more remote or "published" applications 122, to a client device 104, which is rendered and displayed on a local display device of the client device 104. The remote application server 102 may be a virtual application and desktop delivery system that allows users to access and use applications and data from any device, such as the client device 104.

In some aspects, the remote session client 110 is a software application that establishes the remote session 112 as a connection to a new instance of a virtual desktop (e.g., a virtual machine) spawned by the remote application server 102 specifically for a remote session 112, and that allows access to a user's data and applications (e.g., via a roaming profile). An example of a remote session client 110 may be a Parallels® RAS Client (Remote Application Server™ Client) software application. In other aspects, the remote session client 110 may be a remote access application that establishes the remote session 112 as a remote desktop connection to a specific computing device (having the remote session agent 120 executing thereon), such as the user's desktop at their office, server, or virtual machine. Example of remote access applications include Parallels Access® (formerly Parallels Mobile), Apple Remote Desktop™, Citrix GoToMyPC®, and Virtual Network Computing (VNC®). In some aspects, the remote session agent 120 may provide a virtual desktop environment, sometimes referred to as a virtual desktop infrastructure (VDI) for executing applications and accessing data (e.g., private files). In some aspects, the remote session 112 may be implemented using a remote desktop protocol, such as Remote Desktop Protocol (RDP), Virtual Network Computing (VNC), or Personal Computer over Internet Protocol (PCoIP).

There may be situations in which a user needs to make a change to a published application 122 shown on a display device. For example, the published application 122 may be running a presentation program or displaying promotional information on a monitor or projector-based display system 107. In such situations, a user may have a need to modify, interact with, or otherwise provide user input to the published application 122. For example, the user may desire the ability to advance a slide show during a presentation, interact with a display board at a trade show booth, or correct errors in the published application. Aspects of the present disclosure provide a system by which a user can control a published application 122 shown on one or more monitors with the assistance of another client device, referred to herein for clarity as a user device 106 which is separate from the remote application server 102 and the client device(s) 104. While depicted in FIG. 1 as a mobile device, the user device 106 may be any computing device, such as a smartphone, smartwatch, wearable device, tablet device, handheld device, physical server, computer server, desktop, laptop, or any other electronic device as described herein.

As a general overview of one aspect, published applications are executed on the remote application server 102 (e.g., as virtual machines, or within a virtual execution environment). The graphical output and images of the running applications is presented on the client device(s) 104 (e.g., as thin client devices), where users can work with them. The user device 106 and remote client 130 executing thereon is used as a remote control for the published applications 122 displayed on the client device 104. In one approach, the remote client 130 may be configured to connect directly with session 112 on the remote application server 102 (via a connection 135). In an alternative approach, the remote client 130 is configured to control the published application via a connection 136 with the client device 104.

According to an aspect, the user device 106 may include a remote client 130 configured to establish and manage a control communication session 131 with a remote session 112 established between the remote application server 102 and the client device 104. The control communication session 131 enables the user device 106 to act as a remote control relative to the remote session 112 present on the client device 104, effectively acting as a "remote RAS client". In an aspect, the remote client 130 may generate, render, and display a graphical user interface (GUI), referred to herein as a control GUI 132, configured to provide a "control board" to the remote session client 110 running on the client device 104. For example, the remote client 130 may generate and display, on a touchscreen display of the user device 106, a control GUI 132 that includes GUI buttons that correspond to input actions for the published application 122 in the remote session 112. The control board GUI 132 is displayed on the user device 106 only (i.e., not on the client device 104). In one aspect, the inputs will be received from the remote client 130 and outputs will be presented on the client device 104 (RAS client) only, or, in some aspects, on both devices (client device 104 and user device 106). Details of the control GUI 132 are discussed in further detail below in conjunction with FIG. 3. In some aspects, the remote client 130 may be a separate instance of the same remote session client 110 running on the client device 104. In other aspects, the remote client 130 may be an extended version of the same remote session client 110 and which includes remote-control functionality as described herein. In yet other aspects, the remote client 130 may be a dedicated remote RAS client application dedicated to acting as a remote control for existing remote sessions 112.

In an aspect, the remote application server 102 may be configured to store program files, user data, and other information related to the one or more published applications 122, for example in a data store or other storage device communicatively connected to the remote application server 102 (not shown). In some aspects, the remote application server 102 may be configured to store metadata for a published application 122 that indicates one or more "shortcut" user interface actions for that particular application. The list of "shortcut" user interface actions may be pre-determined, for example, by a provider/developer of the application. Alternatively, the list of shortcut user interface actions may be dynamically determined as a list of frequently-used user interface actions according to usage metrics gathered during multiple remote sessions over time. The remote application server 102 may dynamically determine the list of frequently-used user interface actions in aggregate (i.e., across all users), or on a per-user basis (i.e., associated with a particular user). In one implementation, the metadata for a published application may be arranged in the form of an application profile associated with a published application 122, which is used by a remote client 130 to provide a control-board style GUI 132 for the published application.

To connect from the remote client 130 (executing on the user device 106) to the remote session 112 of the client device 104, the user may log into a targeted session on the remote application server 102. By doing this, the remote client 130 may be able to control the session 112 and any currently running published applications 122. Information about the published applications 122 will be stored on the server 102 and will be provided to the remote client 130 on request. If there are no open applications in the session, a list of available published resources will be presented on the screen of the remote client 130 to enable launching of different applications.

As soon as a published application 122 is launched, information about the application is sent to the remote client 130, which in turn generates a request for shortcuts to be displayed. Shortcuts are used to provide a user with access to the published application's most-used features and depend on the application. In one example, the shortcuts may include buttons such as "next" and "previous" for a published application that is a presentation application. In another example, the shortcuts may include buttons for media playback (e.g., play, stop, rewind, fast forward) for a published application that is a media player. In yet another example, the shortcuts may include a virtual keyboard for a published application that is a text editor. These shortcuts may be shown only on the remote client 130 running on the user device 106 (i.e., not on the remote session client 110 running on the client device 104). This will allow the user of the remote client 130 to perform efficiently and quickly perform most frequent actions within the published application and/or remote session 112 on the remote session client 110.

In another aspect, a similar technique may be applied during a connection to the client device 104 instead of the remote application server 102. The user may log into a targeted session with the client device 104 (i.e., rather than the server 102), and take control of an existing remote session 112 established between the client device 104 and server 102. Information about each published application (for creating a control GUI 132 for a running application) may be provided to the remote client 130 by the client device 104. It is noted that before a published application is launched, the client device 104 may retain and store a list of available applications. Therefore, by connecting to the (RAS) client device 104, the remote client 130 is able to start or end the execution of these published applications.

In previous remote application servers, a user is unable to inject or connect to an existing session without losing a remote application's current state. That is, when a user logs in to the server farm from another device, a new or empty session is typically presented. Therefore, to realize the described idea, aspects of the present disclosure provide the maintenance of the state of the session, thereby providing the possibility to have the current session from another device established by connection to the farm with the same credentials.

While aspects of the present disclosure are described in context of a remote application server and remote applications, it is noted that the described techniques can be extended to any type of distributed system. For example, any distributed system having a server system and a client system and that is configured to execute a distributed application that uses a communication session established between the server system and the client system. The distributed system may be configured to coordinate with a third-party device that provides a control user interface for the distributed application.

Figure 2:
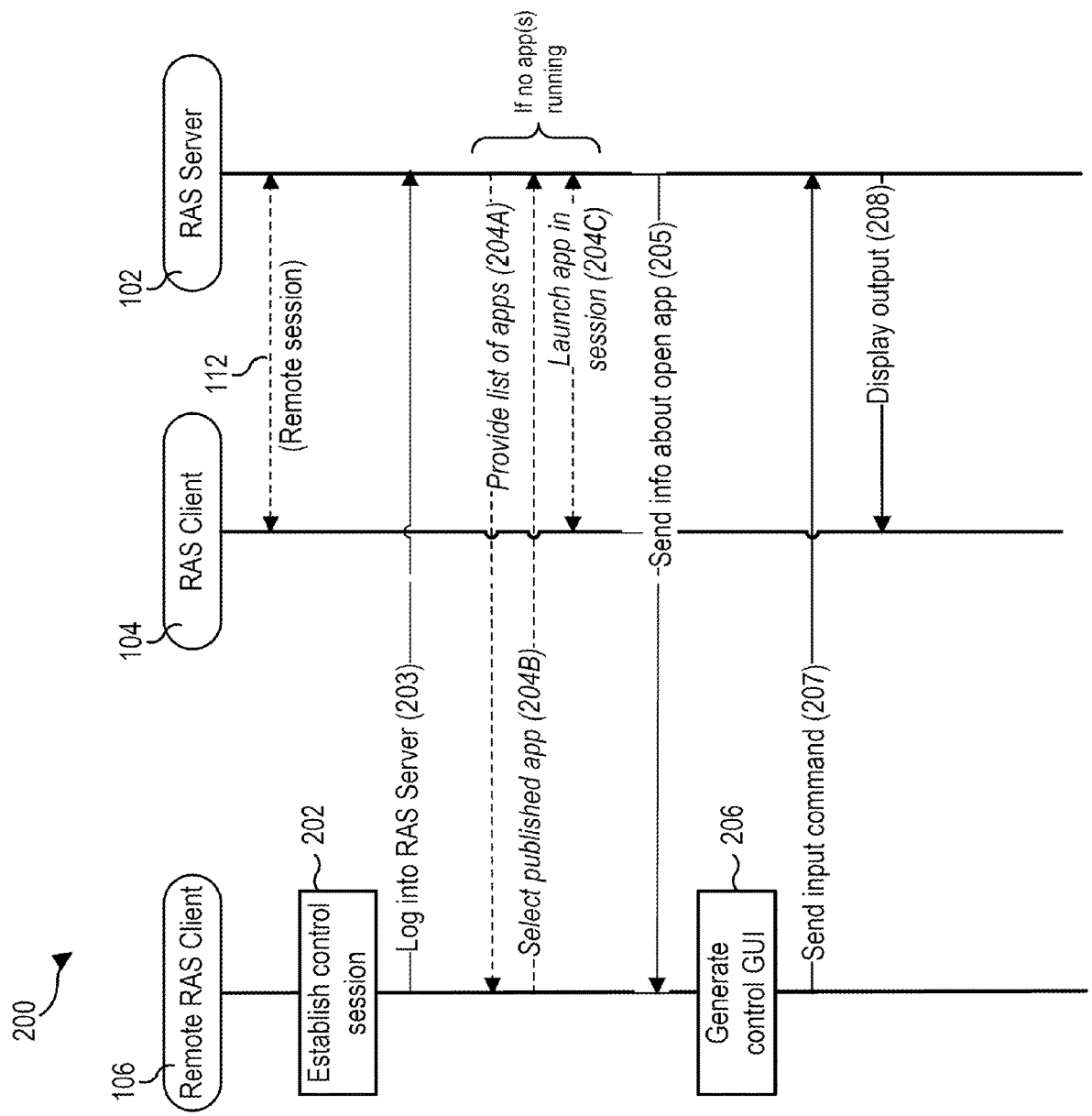
FIG. 2 is a sequence diagram of operations for remotely controlling an application by connecting to a remote application server according to an exemplary aspect.

FIG. 2 is a sequence diagram depicting a method 200 for controlling a remote session established between a client device (i.e., "RAS Client") and a remote application server (i.e., "RAS Server") by a user device (i.e., "Remote RAS Client") according to one aspect.

At block 202, the remote client 130 creates a control communication session 131 with a remote session 112 established between the remote application server 102 and the client device 104. To connect from the remote client to the client's remote session, the user logs into the remote application server 102 to a targeted session (i.e., remote session 112) on the remote application server 102. In some aspects, the user may log into the RAS server using user credentials associated with the user's account which the same credentials used by the user to establish the remote session 112 between the RAS client and the RAS server.

In one implementation, in response to a successful login, the RAS server may provide a list of one or more currently open remote sessions 112 that are associated with the user's account. In some aspects, the remote client 130 may provide a GUI that displays the list of currently open remote sessions, and that receives a user's selection of one of the remote sessions. In some aspects, the displayed list of currently open remote sessions may include information about the RAS clients with which each corresponding remote session is established, such as information indicating a computer name of the RAS client (e.g., "COM-PUTER_01"), a network address of the RAS client (e.g., IP address), and directory information related to the user's account (e.g., "access\USER_01"). The remote client 130 may transmit the user's selection of a targeted remote session to the RAS server in response to user input.

In some aspects, the GUI of the remote client 130 may include one or more control elements (e.g., buttons) configured to receive an indication of whether the selected remote session and any currently running published applications are to be controlled using a control session ("Remote Control") or whether the remote client 130 should take over the remote session ("Take Over"). In response to a selection of a session and a respective Remote Control/Take Over button, the remote client 130 may transmit the indication to the RAS server. In the case of a session takeover, the remote session 112 is both presented on and controlled at the remote client 130 (and no longer displayed on the RAS client). That is the "full" GUI is displayed on both the remote client and the RAS client. In the case of a "remote control" option, the published applications will continue to run in the original RAS client (i.e., client device 104), and control input is handled as described below. In other words, only certain action buttons (e.g., command GUI) are displayed on the remote client, and the full GUI is displayed on the RAS client.

In some aspects, after the remote client 130 successfully logs into the targeted session, the RAS server may send metadata information about any published applications currently running in the remote session (action 205). In an aspect, the remote client 130 may receive, from the remote application server, an application profile for each published application 122 open and running in the remote session 112. As mentioned earlier, the application profile(s) may indicate information about shortcut user interface actions for the published applications. For example, the remote client 130 may receive an application profile for a currently running presentation program that specifies a "previous slide" action, a "next slide" action, a "go to start of presentation" action, and a "go to end of presentation" action.

In some cases, responsive to determining that there are no open applications in remote session 112, the RAS server may transmit a list of available published resources to the remote client 130 (action 204A). In response, the remote RAS client may generate and provide the list of available published applications to the user for user selection. The remote RAS client may transmit an indication of a user selection of a published resource (action 204B). In response, the RAS server may then launch the requested application 122 in the remote session 112 (action 204C). In this case, the launched application may be displayed at the display device of the RAS client, rather than the remote RAS client.

At block 206, the remote client 130 may generate and display (e.g., on the user device 106) a control GUI 132 that may be used to remotely control a published application displayed on the client device 104. In an aspect, the control GUI 132 (e.g., displayed on a user device 106) for an application may include one or more UI elements configured to cause a corresponding input command to be transmitted to the RAS server. The UI elements (e.g., buttons) may correspond to a plurality of application-specific shortcuts or user interface actions. In an aspect, the UI elements of the control GUI 132 may be a selected subset of the total UI actions, commands, and features available from the published application 122. As mentioned earlier, the UI elements of the control GUI 132 may represent the frequently-used UI actions, commands, and features of the published application.

In an aspect, the remote client 130 may receive a user input from the control GUI 132 indicating a particular feature of the application 122 (e.g., "Next Slide"). In response, the remote client 130 may transmit an input command (action 207) to the RAS server that causes invocation of the corresponding feature on the application 122 within the remote session 112. For example, an input command may be injected into the remote session 112 in the form of raw input device data, such as a mouse click event at a particular set of coordinates of the GUI of the displayed application in the remote session. In another example, the input command transmitted to the RAS server may be formatted according to a high-level UI exposed by the application itself, or by an operating system on which the application 122 is executing. The RAS server may receive and process the input command for the application 122, which may result in a change in the display or graphical output of the application 122. For example, in response to a "next slide" action, the RAS server may invoke a corresponding "next" command to a presentation program, which causes a change in graphical output to a new slide of the presentation program. The graphical output of the new slide is provided to the RAS client (action 208). The RAS server may send an updated graphical output (e.g., framebuffer) or other indication of a change in output to the RAS client only (which is displaying the application 122), and not the remote client 130.

Figure 3:
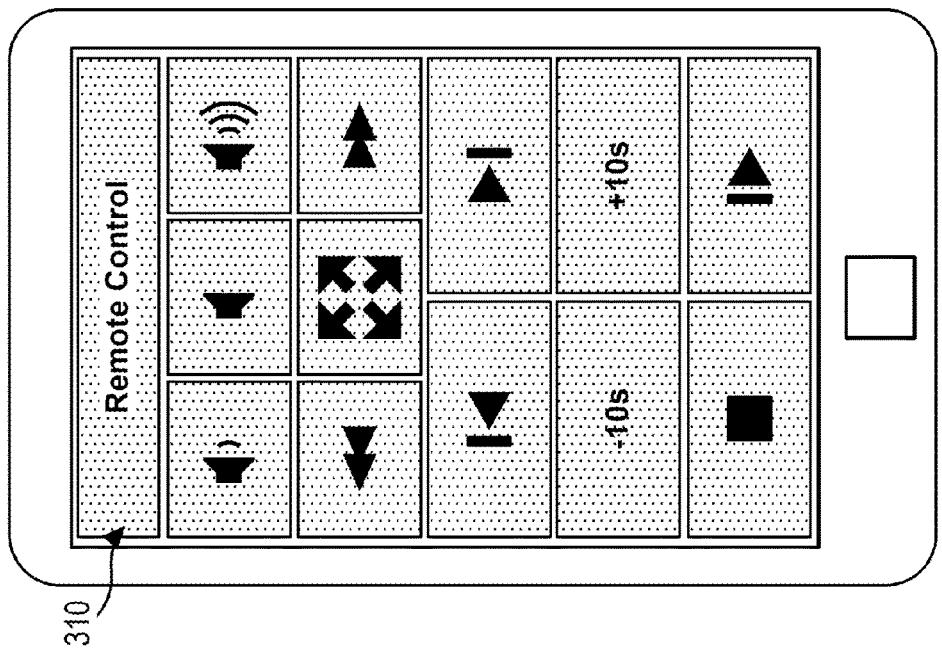
FIG. 3 is a block diagram of exemplary graphical user interfaces for remotely controlling an application executing in a remote session according to an exemplary aspect.
Figure 3:
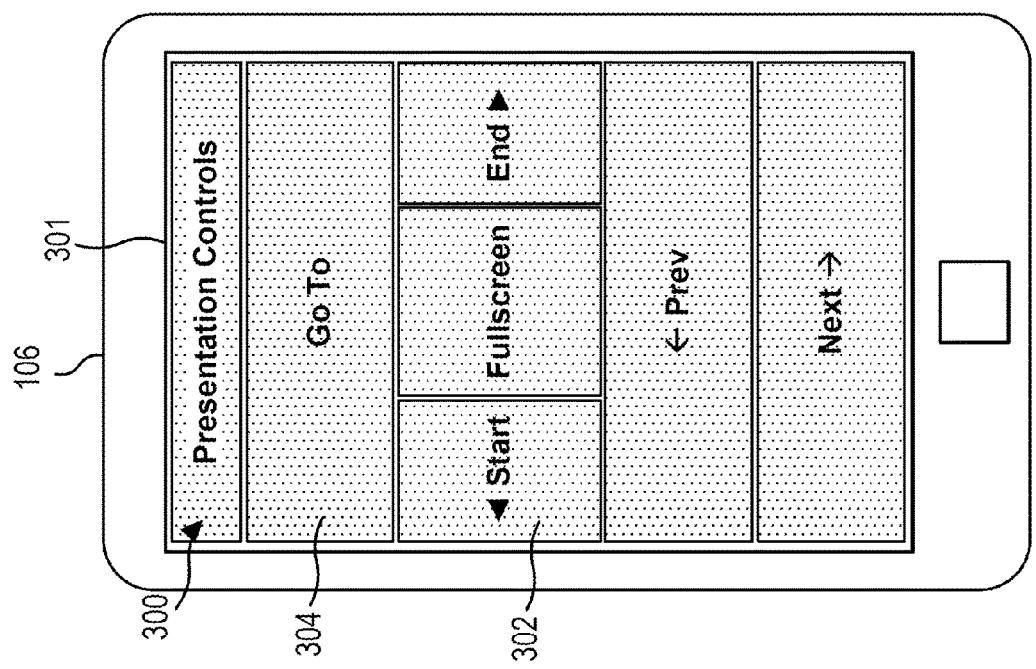

FIG. 3 is a block diagram of exemplary graphical user interfaces 300, 310 for remotely controlling an application executing in a remote session according to an exemplary aspect. As shown in FIG. 3, a control GUI 300 may be rendered and displayed on an input device 301 of a user device 106. The input device 301 may be a display device (e.g., touchscreen) configured to receive touch input from an input object (e.g., finger, stylus) onto the control GUI 300. In some aspects, the control GUI 300 may be generated with a size and dimension so as to occupy all or substantially all of the input device 301. The UI elements 302 of the control GUI 300 may be configured to, when activated by user input, inject a corresponding UI command to the application 122 executing within the remote session 112. In one implementation, the remote client 130 may inject a corresponding input command into the remote session 112 according to an application profile that specifies a remote execution interface of the remote application 122.

In the example shown in FIG. 3, the control-board GUI 300 is configured to provide one or more shortcuts to a presentation application executing in a remote session. The control-board GUI 300 includes one or more UI controls 302 for navigating a slideshow (e.g., "Prev", "Next", "Start", "End"), and UI controls for controlling the view of a slideshow (e.g., "Full screen"). In one example, a presentation application may be running in a remote session 112 established between the RAS server and a RAS client. In this scenario, the RAS client may either have no available input devices, or input devices that are inaccessible to the location of the user. As such, the user operates their user device 106 to establish a communication session with the remote session 112, which causes the control GUI 300 to appear on their user device 106. The user may select (e.g., via touch input) a "Next" button on the control GUI 300 displayed on the user device 106. In response, the remote client 130 transmits a corresponding input command to navigate to a next slide of a slideshow of a presentation application to the RAS server, which in turn causes the next slide to appear on the RAS client and not on the user device 106.

In some aspects, the control GUI may further include a virtual keyboard element or a virtual trackpad element configured to inject keyboard input and cursor input into the remote session 112. By way of example, the control GUI 300 includes a page seek UI element 304 (e.g., "Go To") that is configured to, when pressed, prompt the user to manually enter a numeric value (e.g., "10") to navigate to a particular slide of the slideshow.

In another example shown in FIG. 3, a remote client 130 may generate a control-board GUI 310 that is configured to shortcuts for a media application executing in a remote session 112. The control-board GUI 310 includes one or more UI elements 312 for controlling media playback (e.g., "Play", "Pause", "Stop", "Rewind", etc.), UI elements for controlling volume, and UI elements for controlling the display of the media application (e.g., "Full-screen"). Similar to the example GUI described earlier, the GUI 310 may be configured to, when activated, inject a corresponding input command into the remote session 112 that causes a change in operation of the media application running in the remote session. In some aspects, in response to the input commands, the rendering of a video or other media as displayed on the client device 104 is updated on the client device 104, but not on the user device 106.

Figure 4:
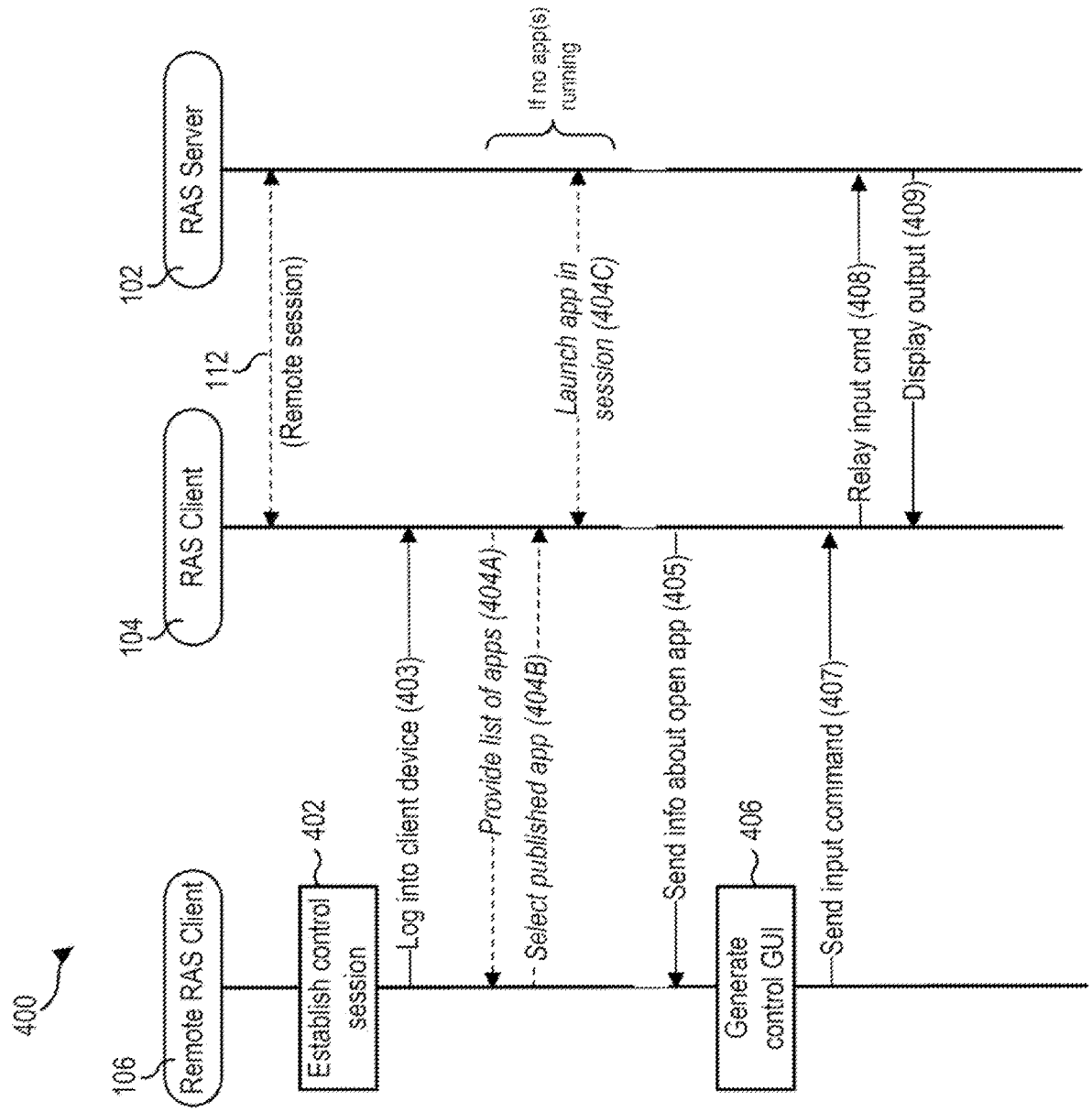
FIG. 4 is another sequence diagram of operations for remotely controlling an application by connecting to a client device according to a variant aspect.

FIG. 4 is a sequence diagram depicting a method 400 for controlling a remote session established between a client device (i.e., "RAS Client") and a remote application server (i.e., "RAS Server") by a user device (i.e., "Remote RAS Client") according to another aspect. The method 400 is similar to the approach seen in FIG. 2, except that the user device connects to the client device rather than directly to the remote application server.

At block 402, the remote client 130 creates a control communication session with a remote session 112 between a remote application server and a client device by remotely accessing the client device 104 itself. In a conventional approach, the control communication session can be a remote desktop session or remote access session established with the client device 104 itself, in which the desktop of the client device 104 (including the displayed published application 122 running thereon) is scaled and displayed on the remote client 130. However, this conventional approach has several drawbacks, including performance and latency issues arising from the use of two levels of redirection. Accordingly, rather than merely take over the remote session, aspects of the present disclosure allow the remote client 130 to log into a RAS client, which causes only a control GUI to be formed and displayed on the user device, instead of the entire desktop view.

In some aspects, the remote client 130 may transmit a login request to the RAS client (action 403), using a set of credentials associated with the user's account on the client device 104, and/or the set of credentials associated with the user's account on the RAS server. If no published applications 122 are running, the RAS client may provide a list of published resources to the remote RAS client. This list of published resources may be based on the list of published resources provided to the RAS client by the RAS server when the remote session 112 was established previously. In an aspect, the remote client 130 (e.g., via user input) may transmit a user selection of an application to the RAS client, which relays the request to the RAS server. As a result, the RAS server launches the selected application 122 within the remote session established between the RAS server and RAS client. A similar request may be used to terminate the execution of an application 122 within the remote session 112.

In an aspect, the RAS client may transmit to the remote RAS client metadata information about the published application currently running (or newly running) in the remote session (action 405). The metadata information about the application running in the remote session may be similar to the application profile described earlier, for example, specifying a subset of user actions, commands, and features of the application 122 to be made available on the limited size of the control board GUI.

At block 406, the remote client 130 may generate and display (e.g., on the user device 106) a control graphical user interface that may be used to remotely control the application 122 executing on the server and displayed on the client device. In an aspect, the control GUI 132 for a particular application is displayed on the user device and includes one or more UI controls configured to cause a corresponding input command to be transmitted to the RAS client (action 407), and then in turn relayed to the RAS server (action 408). In an aspect, the UI controls of the control GUI 132 may be a subset of the total UI actions, commands, and features available from the published application 122. As mentioned earlier, the UI elements of the control GUI 132 may represent the frequently-used UI actions, commands, and features of the published application. The RAS server handles the input command and provides an updated display output to the RAS client (action 409) and not the remote RAS client.

In an alternative aspect, the RAS client may be configured to detect a control communication session being made by a remote RAS client to the RAS client. In response, the RAS client may instead facilitate the establishment of a direct command communication session between remote RAS client and the RAS server (and instead of using the RAS client as an intermediary). For example, in response to a request for a control communication session from a remote RAS client, the RAS client may instead send a response directing the remote RAS client to send the request for a control communication session directly from the RAS server. This response may include network address of the RAS server and at least one identifier indicating the targeted remote session that the remote RAS client is attempting to establish. This aspect may be useful in situations in which the remote client 130 only has the network address of the RAS client but not the RAS server.

Figure 5:
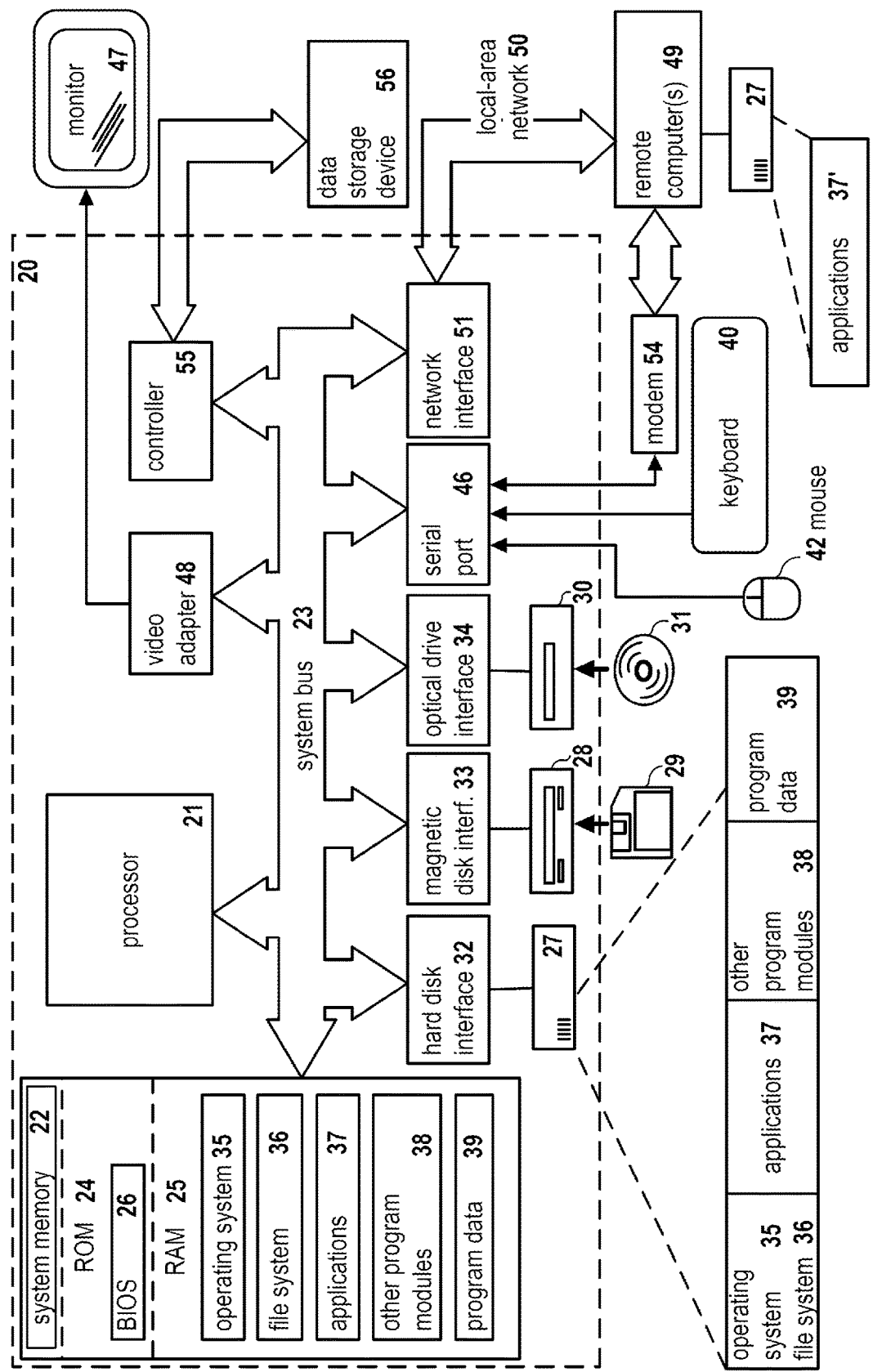
FIG. 5 is a block diagram of a computer system on which the disclosed system and method can be implemented according to an exemplary aspect.

FIG. 5 is a block diagram illustrating a computer system 20 on which aspects of systems and methods for managing an application executing in a remote session may be implemented in accordance with an exemplary aspect. It should be noted that the computer system 20 can correspond to the remote application server 102, client devices 104, and user devise 106, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A non-transitory computer readable medium comprising computer executable instructions, the computer executable instructions when executed by a microprocessor of a user device cause the microprocessor to execute a process comprising:
creating a control communication session for an application executing within a remote session established between a remote application server and a client device, wherein the application is in execution upon the client device;
receiving metadata associated with the application executing in the remote session, wherein the metadata indicates a subset of user actions available from the application;
generating, for display on the user device, a control board graphical user interface (GUI) based on the received metadata, wherein the control board GUI is configured to, when activated by user input, inject input commands into the remote session for the application; wherein
the input commands injected into the remote session are transmitted to the remote application server and employed by the remote application server such that the user device at least one of makes changes to, provides commands to, and interacts with the application;
the remote application server is configured to access application metadata defining user interface actions for the application and usage metrics relating to used user interface actions gathered during multiple remote sessions over time;
the metadata received by the user device relates to used user interface actions;
the used user interface actions are dynamically established by the remote application server in dependence upon the application metadata relating to a frequency of use of user interface actions for the application and a subset of the usage metrics; and
the subset of the usage metrics are one of:
at least one of those usage metrics of a user of the user device and those usage metrics of a user of the application upon the client device;
at least one of those usage metrics of a predetermined subset of all users of the user device and those usage metrics of a predetermined subset of all users of the application upon the client device;
at least one of those usage metrics of a user of the user device within a predetermined period of time prior to the current remote session being established and those usage metrics of a user of the application upon the client device within a predetermined period of time prior to the current remote session being established; and
at least one of those usage metrics of a predetermined subset of all users of the user device within a predetermined period of time prior to the current remote session being established and those usage metrics of a predetermined subset of all users of the application upon the client device within a predetermined period of time prior to the current remote session being established.

2. A non-transitory computer readable medium comprising computer executable instructions, the computer executable instructions when executed by a microprocessor of a user device cause the microprocessor to execute a process comprising:
creating a control communication session for an application executing within a remote session established between a remote application server and a client device, wherein the application is in execution upon the client device;
receiving metadata associated with the application executing in the remote session where the received metadata relates to used user interface actions representing a subset of user actions available from the application;
generating, for display on the user device, a control board graphical user interface (GUI) based on the received metadata, wherein the control board GUI is configured to, when activated by user input, inject input commands into the remote session for the application; wherein
the input commands injected into the remote session are transmitted to the remote application server and employed by the remote application server such that the user device at least one of makes changes to, provides commands to, and interacts with the application;
the remote application server is configured to access application metadata defining user interface actions for the application and usage metrics relating to used user interface actions gathered during multiple remote sessions over time;
the used user interface actions are established by the remote application server in dependence upon the application metadata relating to a frequency of use of user interface actions for the application and a subset of the usage metrics; and the subset of the usage metrics are one of:
- at least one of those usage metrics of a user of the user device and those usage metrics of a user of the application upon the client device;
- at least one of those usage metrics of a predetermined subset of all users of the user device and those usage metrics of a predetermined subset of all users of the application upon the client device;
- at least one of those usage metrics of a user of the user device within a predetermined period of time prior to the current remote session being established and those usage metrics of a user of the application upon the client device within a predetermined period of time prior to the current remote session being established; and
- at least one of those usage metrics of a predetermined subset of all users of the user device within a predetermined period of time prior to the current remote session being established and those usage metrics of a predetermined subset of all users of the application upon the client device within a predetermined period of time prior to the current remote session being established.

3. A non-transitory computer readable medium comprising computer executable instructions, the computer executable instructions when executed by a microprocessor of a user device cause the microprocessor to execute a process comprising:

retrieving metadata from a memory where the metadata is associated with an application executing within a remote session established between a remote application server and a client device upon which the application is in execution where the received metadata relates to used user interface actions representing a subset of user actions available from the application;

generating, for display on the user device, a control board graphical user interface (GUI) based on the received metadata, wherein the control board GUI is configured to, when activated by user input, inject input commands into the remote session such that the user device at least one of makes changes to, provides commands to, and interacts with the application; wherein the remote application server is configured to access application metadata defining user interface actions for the application and usage metrics relating to used user interface actions gathered during multiple remote sessions over time and establish in dependence upon this application metadata the metadata stored within the memory where the metadata is generated by the remote application server in dependence upon the application metadata relating to a frequency of use of user interface actions for the application and a subset of the usage metrics; and the subset of the usage metrics are one of:
- at least one of those usage metrics of a user of the user device and those usage metrics of a user of the application upon the client device;
- at least one of those usage metrics of a predetermined subset of all users of the user device and those usage metrics of a predetermined subset of all users of the application upon the client device;
- at least one of those usage metrics of a user of the user device within a predetermined period of time prior to the current remote session being established and those usage metrics of a user of the application upon the client device within a predetermined period of time prior to the current remote session being established; and
- at least one of those usage metrics of a predetermined subset of all users of the user device within a predetermined period of time prior to the current remote session being established and those usage metrics of a predetermined subset of all users of the application upon the client device within a predetermined period of time prior to the current remote session being established.

\* \* \* \* \*